United States Patent [19]

Gratton

[11] Patent Number: 5,129,667
[45] Date of Patent: Jul. 14, 1992

[54] AIRCRAFT TOW CONNECTOR

[76] Inventor: Richard Gratton, 34 Thorn St., Sewickley, Pa. 15143

[21] Appl. No.: 601,457

[22] Filed: Oct. 22, 1990

[51] Int. Cl.$^5$ .............................................. B60D 1/00
[52] U.S. Cl. .................................. 280/493; 280/504; 244/50
[58] Field of Search ............. 180/904; 280/453, 460.1, 280/493, 504, 507, 515; 244/50

[56] References Cited

U.S. PATENT DOCUMENTS

| | | | |
|---|---|---|---|
| 2,295,021 | 9/1942 | Weiss | 280/504 |
| 2,306,388 | 12/1942 | Johnson et al. | 280/493 |
| 3,331,619 | 7/1967 | Muelling | 280/460.1 |
| 3,709,522 | 1/1973 | Olson | 280/453 |
| 3,955,832 | 5/1976 | Kalmanson | 280/476 |
| 3,995,878 | 12/1976 | Geraci et al. | 280/488 |
| 4,418,936 | 12/1983 | Adams et al. | 280/493 |
| 4,658,924 | 4/1987 | Dobbie | 180/14.1 |
| 4,955,777 | 9/1990 | Ineson | 180/904 |

FOREIGN PATENT DOCUMENTS 3642044 6/1988 Fed. Rep. of Germany ........ 244/50

Primary Examiner—Charles A. Marmor
Assistant Examiner—Kevin Hurley
Attorney, Agent, or Firm—Webb, Burden, Ziesenheim & Webb

[57] ABSTRACT

A tow connector engageable with a nose strut of an aircraft for towing the aircraft. The connector has an arm and a base extending therefrom with spaced fingers extending from the base parallel to the arm. Each finger has an upper portion which houses a slideable shaft and a notch located at the forward end of each finger for engaging lateral studs on a nose strut of an aircraft. The shafts are slideable between the notches in the fingers and a pair of stops mounted on the base. The tow connector includes an adjustment mechanism having a pin with a head biased upwardly by a spring to protrude above the top surface of each finger adjacent to the rear end of each shaft to maintain the shafts in the forward lock position. A moveable handle is connected to a compression plate to move the heads downwardly to provide clearance to move the shafts.

20 Claims, 4 Drawing Sheets

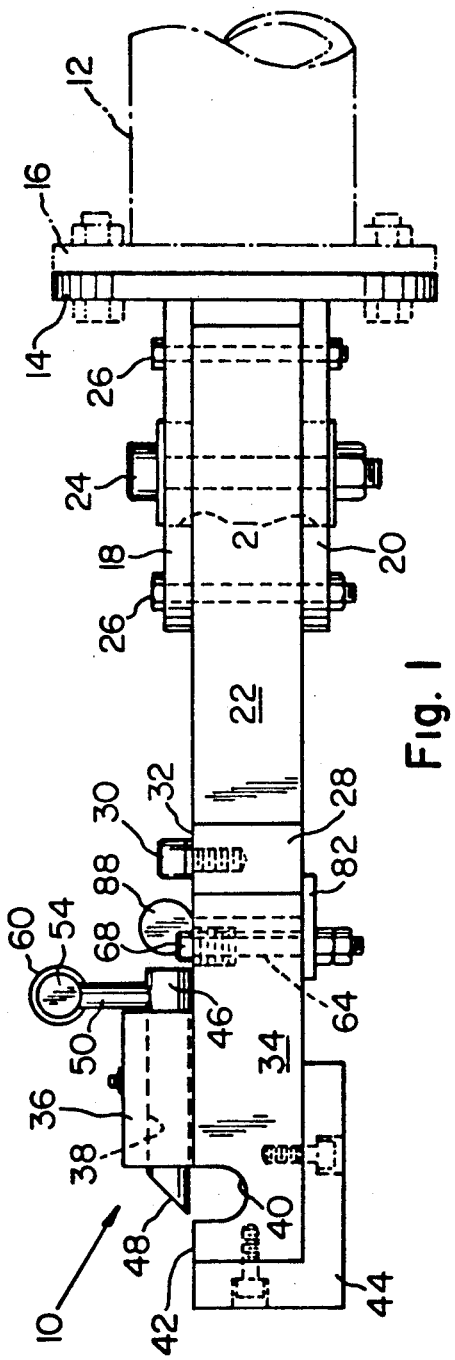
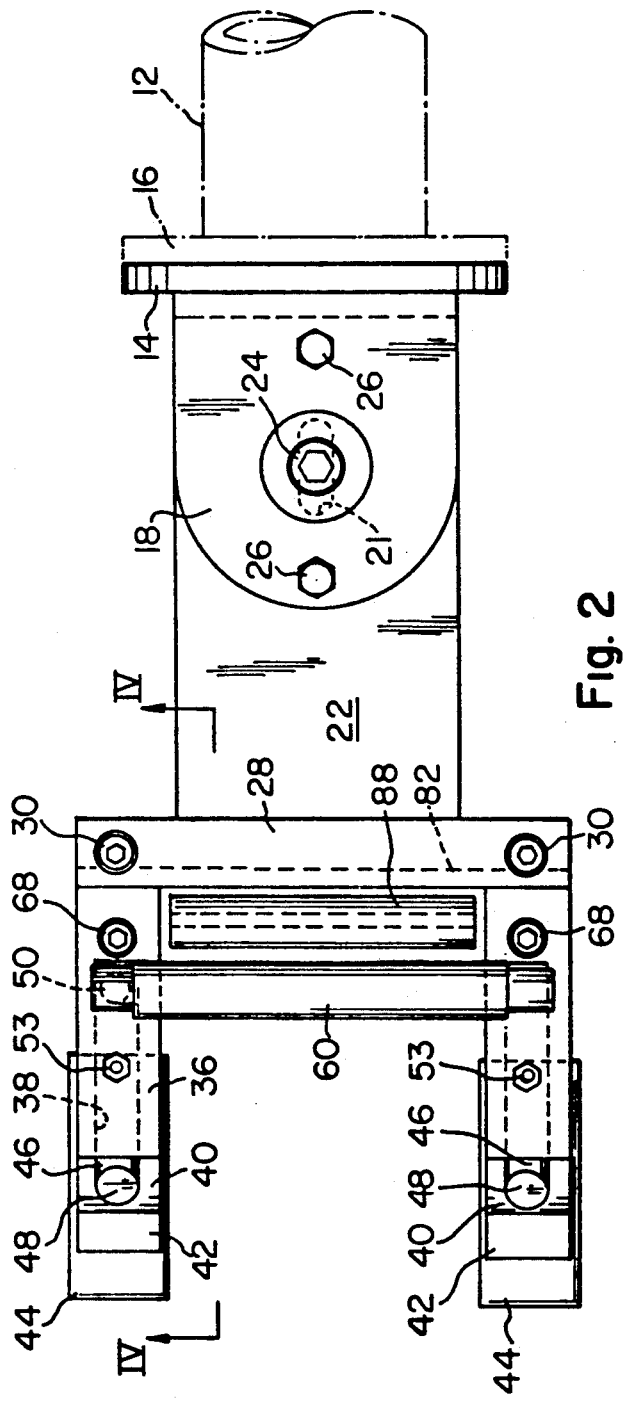
Fig. 1
Fig. 2

AIRCRAFT TOW CONNECTOR

BACKGROUND OF THE INVENTION

1. Field of the Invention

This invention relates generally to apparatus for towing an aircraft on the ground, and more particularly, to a tow connector which engages an aircraft nose strut to tow the aircraft.

Typically, aircraft are transported on the ground using a vehicle having a tow bar with a connector at its distal end which engages the aircraft. In the usual operation, a member of the ground crew aligns the connector with the aircraft and operates a mechanism to lock the connector in place on the aircraft.

2. Description of the Prior Art

U.S. Pat. No. 4,418,936 discloses a tow bar head for aircraft wherein the tow bar head is aligned with a cross pin on the nose strut. A removable locking pin is pulled from the body of the tow bar head and a positive deadbolt slide lock is retracted by the ground crew person to provide clearance for the cross pin to engage a transverse slot in the underside of the tow bar head. A handle on the deadbolt is then released and the slide lock is returned to the lock position by a spring. The locking pin is then reinserted into the body of the tow bar head to prevent withdrawal of the slide lock.

U.S. Pat. No. 3,709,522 discloses a tow bar apparatus having a pair of bifurcated jaws which are closeable on a tow pin of the aircraft landing gear by rotation of a handle.

U.S. Pat. No. 3,955,832 discloses an aircraft tow bar device having a latch arrangement comprising opposite slide fingers with extending latch pins for engaging holes in a pair of brackets extending from the nose strut of an aircraft. In order to secure the tow bar to the strut, a lever arm is manually rotated and the slide fingers are then opened for receiving the brackets on the strut. Before the lever arm is rotated, a knob must be pulled upwardly to withdraw a plunger which locks the lever arm in the engaged position.

The prior art tow connectors described above require various manipulations by ground crew persons to secure and release them on and off the nose strut. In many cases, especially commercial aircraft applications, timing is critical and a tow connector which may be engaged on the nose strut with minimal time and effort is desirable. Additionally, it is desirable to provide a tow connector with a low profile at its forward end to avoid damaging aircraft nose gear. Accordingly, it is an object of the present invention to provide an aircraft tow connector which does not require a multiplicity of actions by the ground crew and which may be engaged to the nose gear by one hand, without damaging the nose gear.

SUMMARY OF THE INVENTION

The invention is a tow connector engagable with a nose strut of an aircraft for towing the aircraft. The connector is attached to an arm and includes a base extending from the distal end of the arm perpendicular thereto with a stop mounted on the top surface of the base at each lateral end, and spaced fingers extending perpendicular to the base and parallel to the arm. Each finger has an upper portion, which defines a throughbore, and a notch having a shortened forward leg at its forward end.

A shaft is mounted in each throughbore and each shaft is moveable between a notch and a stop. Each shaft has an angled front end, and there is an upright member extending from the rear end of each shaft. A bar extends from each upright member and is perpendicular thereto. A moveable sleeve loosely encases both bars and bridges a gap defined by the distal ends of the bars.

An adjustment mechanism is provided for maintaining the shafts in a locked position, wherein the front end of each shaft extends above the open top of the notch in each finger thereby securing the connector to the strut.

The arm may be pivotally mounted between two plates having a central slot for slideable movement of the arm, and the plates may have at least one shear pin extending therebetween and engaging the arm at a point radially spaced from the pivot point of the arm. There may also be a flange extending between the ends of the two plates perpendicular thereto, the flange being engageable on a boom for carrying the connector. The connector also includes a pair of grease fittings for lubricating the shafts and the throughbores.

A first embodiment of the tow connector has an adjustment mechanism which comprises a locking pin mounted in a bore located in the rear portion of each finger. The locking pin has a raised head which extends above the top surface of each finger and the bore has an enlarged upper portion and an annular seat. A spring is located between each head and each annular seat to bias the head upwardly. A compression plate extends between the lower end of each pin adjacent to the bottom surface of the finger and the compression plate has beveled bores for receiving the pins and is secured to each pin at a position located on one side of the longitudinal center line of the compression plate. A fixed handle extends upwardly from the compression plate between the fingers whereby movement of the fixed handle toward the front of the tow connector causes the compression plate to pivot with respect to the bottom surfaces of the fingers and thereby draw the pin and the head downwardly into the enlarged upper end of the bore to compress the spring and provide clearance for slideable rearward movement of the shafts from the lock position above the notches to the rearward open position.

The pins of the adjustment mechanism are positioned in the fingers so that when the heads of the pins are fully extended in the upper position they are adjacent to the rear ends of the shafts to prevent rearward movement of the shafts and thereby secure them in the forward lock position. Further, the heads may engage the bottom surface of the shafts when the shafts are in the rearward open position to apply an upward force to the shafts and thereby prevent free-sliding movement of the shafts.

A second embodiment of the connector has an adjustment mechanism for each shaft which comprises a ball detent and cup arrangement wherein a ball is biased upwardly by a spring which rests on a threaded plug in a bore located beneath the shaft. The ball engages a first cup formed on the bottom surface of the shaft when the shaft is in the open position. The ball engages a second cup formed on the bottom surface of the shaft when the shaft is in the forward lock position.

A third embodiment has at least one stop extending between the upper and lower plates for restricting the angular movement of the arm. The stop may include a bolt mounted in a pair of bores, one each in the upper and lower plates, with a sloppy fit. The bolt restricts the total angular movement of the arm to less than 90°.

The tow connector may include a bumper on the exterior surface of the forward end of each finger.

The features which characterize the invention are pointed out with particularity in the claims annexed to and forming a part of this disclosure. For a better understanding of the invention, its operating advantages and the specific objects obtained by its use, reference should be had to the accompanying drawings and descriptive matter in which preferred embodiments of the invention are illustrated and described. Like reference characters describe like parts throughout the drawings.

BRIEF DESCRIPTION OF THE DRAWINGS

FIG. 1 is a side view of a tow connector in accordance with the invention;

FIG. 2 is a plan view of the tow connector of FIG. 1;

DETAILED DESCRIPTION OF THE PREFERRED EMBODIMENTS

Figure 3:
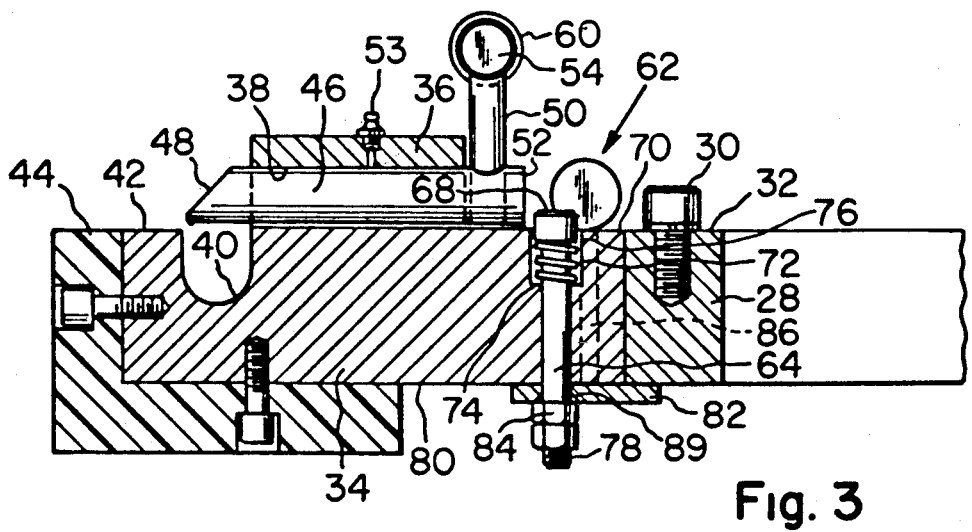
FIG. 3 is a partial section of the tow connector of FIG. 1.
Figure 4:
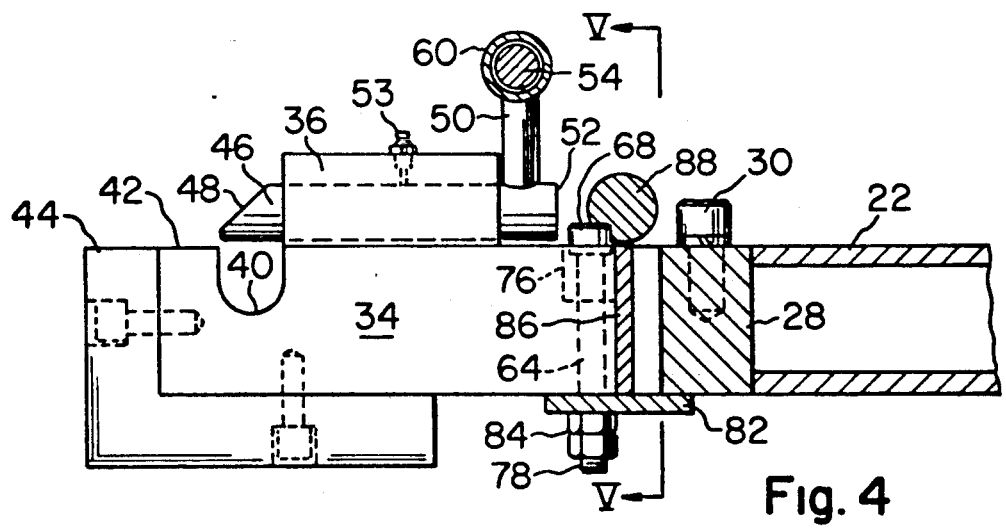
FIG. 4 is a section on line IV—IV of FIG. 2.

FIGS. 1 and 2 show a tow connector 10 in accordance with the present invention. Tow connector 10 is bolted to a boom 12 which is attached to a vehicle (not shown) for towing an aircraft. The tow connector 10 has a flange 14 at its rear end which mates with a flange 16 on the end of boom 12 to secure the connector thereto. The flange 14 has an upper plate 18 and a spaced parallel lower plate 20 extending therefrom and each plate has a central slot 21 therein. An arm 22 is pivotally mounted between plates 18 and 20 by a bolt 24. In normal operation, the arm is held against rotation by a pair of shear pins 26 which extend between upper plate 18 and lower plate 20 and engage arm 22 at points spaced from bolt 24. Shear pins 26 are designed to shear off at about 18,500 pounds of force to allow arm 22 to pivot freely and slide along central slot 21, thus avoiding damage to aircraft landing gear.

A base 28 extends from the distal end of arm 22 and is perpendicular to arm 22. The base has a stop 30 mounted at each lateral end. Each stop 30 is threaded into a blind tapped hole in base 28 and the upper end of each stop extends above the top surface 32 of base 28. Though not shown as such, stops 30 may be mounted in throughbores and secured by nuts at the bottom of base 28.

Two fingers 34 extend perpendicular to base 28 and parallel to arm 22. A finger 34 extends from each lateral end of base 28 in substantial alignment with a stop 30. Each finger 34 has an upper portion 36 having a throughbore 38 extending parallel to the longitudinal axis of the finger. Each finger also has an open top notch 40 at its forward end, and the forward leg 42 of each notch terminates substantially below the top of the upper portion 36 of the finger. The shortened forward leg 42 of each notch 40 minimizes the profile of the front end of the tow connector to insure that structural damage to aircraft landing gear is avoided. The forward end of each finger 34 may have a bumper 44 affixed to its exterior surfaces to minimize wear and tear on the tow connector and on the aircraft. The bumper 44 is preferably made from a durable substance such as polyurethane.

Each throughbore 38 houses a slideable shaft 46 having an angled front end 48 to further minimize the profile of tow connector 10. Each shaft 46 is slideable between the forward lock position over notch 40 and the rearward open position in contact with a stop 30. Each shaft has a perpendicular upright 50 extending upwardly from its rear end 52. Each upright 50 engages the rear of upper portion 36 of each finger 34 to prevent shaft 46 from sliding completely through throughbore 38 when the shaft is in the forward lock position. Each finger has a grease fitting 53 mounted on its upper portion 36 for lubrication of shafts 46 in throughbores 38.

Figure 5:
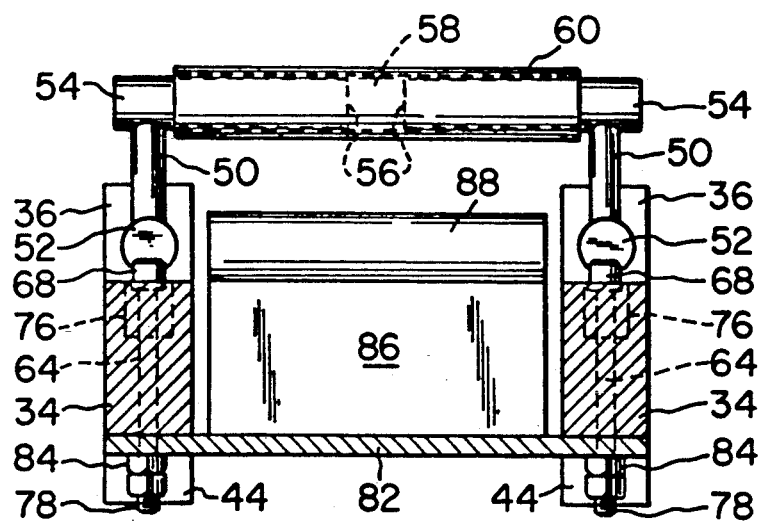
FIG. 5 is a section on line V—V of FIG. 4.

Each upright 50 has a perpendicular bar 54 at the upper end as shown in FIG. 5. The inward ends 56 of bars 54 define a gap 58 which is bridged by a moveable sleeve 60 that encases and aligns both bars.

Referring to FIG. 3, an adjustment mechanism 62 is included in connector 10 for engaging and disengaging the connector with the nose strut of an aircraft, as discussed in detail hereinafter. The adjustment mechanism comprises a pin 64 mounted in a throughbore 66 in the rear portion of each finger 34. Each pin has a head 68 which is biased upwardly by a coil spring 72 to protrude above the top surface 70 of each finger 34. Each spring rests on an annular seat 74 at the bottom of an enlarged counterbore 76 at the upper end of throughbore 66. The pin 64 includes a threaded section 78 at its lower end which extends below the bottom surface 80 of each finger 34. A compression plate 82 extends between the lower ends of pins 64 and is secured to each pin by a double-nut 84 on threaded section 78. The double-nuts reduce maintenance and wear on the adjustment mechanism 62 by eliminating the need for frequent tightening. Each pin 64 engages compression plate 82 at a point which is offset from the longitudinal axis of the compression plate.

Figure 6:
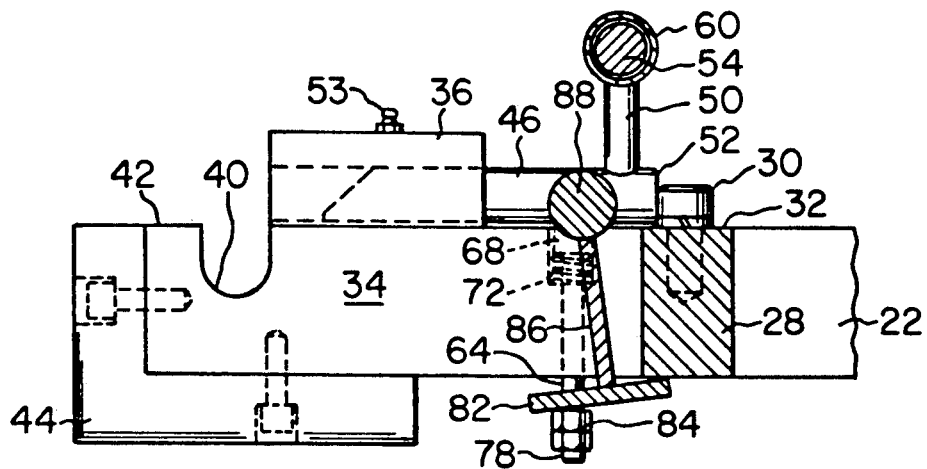
FIG. 6 is a partial section showing a shaft in the retracted position.
Figure 8:
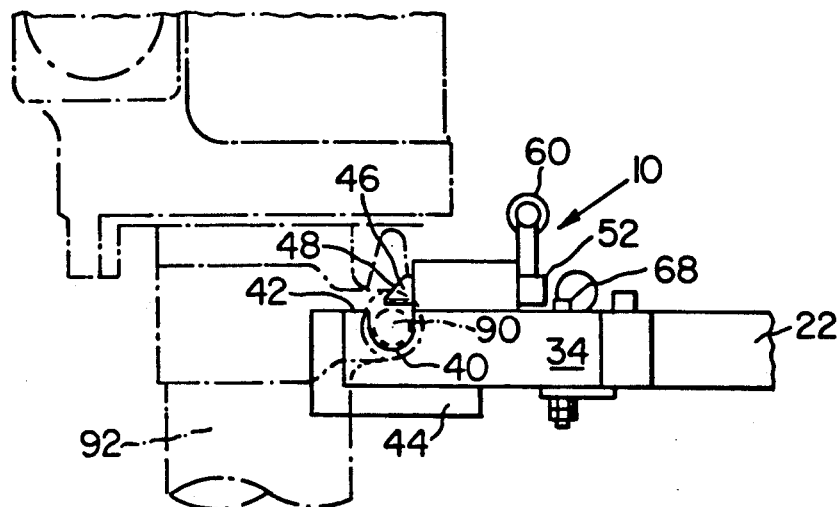
FIG. 8 is a schematic diagram of the tow connector engaged with a nose strut of an aircraft.

Compression plate 82 has a fixed handle 86 extending upwardly therefrom between fingers 34 as best shown in FIG. 5. A pushbar 88 is attached to the top of fixed handle 86 and extends above the plane of the top surfaces 70 of fingers 34. Referring to FIG. 6, when pushbar 88 is urged forwardly, the compression plate is caused to pivot against the bottom surface of base 28 to draw the heads 68 of pins 64 downwardly below the plane of the top surfaces 70 of the fingers while compressing coil springs 72. Pivoting is facilitated by a beveled bore 89 which receives each pin 64 with a certain degree of play as shown in FIG. 3. Thus, clearance is provided for retraction of shafts 46 to the open position with the rear ends 52 of the shafts abutting stops 30. This opens the notch 40 to receive a stud 90 located on a nose strut 92 of an aircraft as shown in FIG. 8. The shafts 46 may be retracted by pulling the moveable sleeve 60 rearwardly while moving pushbar 88 forwardly.

While shafts 46 are in the open position, shown in FIG. 6, pressure on pushbar 88 is released, and spring 72 biases head 68 upwardly to contact the bottom of each shaft to prevent free-sliding movement and accidental reengagement of the shafts in the lock position. The angled front end 48 of each shaft is withdrawn from the notch 40 of each finger, thus providing clearance for the insertion of the studs 90 into the notches. The rear end 52 of each shaft 46 contacts a stop 30 to prevent the shafts from completely sliding free from throughbores 38. Replacement of the shafts is easily achieved by removing both stops 30 to provide clearance for the shafts to be completely withdrawn from the throughbores 38.

FIG. 3 shows shafts 46 and adjustment mechanism 62 in the lock position wherein the angled front end 48 of each shaft is extended over the notch 40 in each finger to secure tow connector 10 to studs 90 on nose strut 92. To insure that shafts 46 remain in the forward lock position, a head 68 of a pin 64 is aligned with the longitudinal axis of each shaft and is positioned directly adjacent to the rear end 52 of a shaft.

To move the shafts to the lock position from the open position, pushbar 88 is moved forwardly to release the friction on the bottom of the shafts. At the same time, sleeve 60 is moved forwardly until uprights 50 engage the rear of the upper portions 36 of the fingers. This is a one-hand operation which provides fast and simple engagement of the tow connector with the aircraft.

Figure 7:
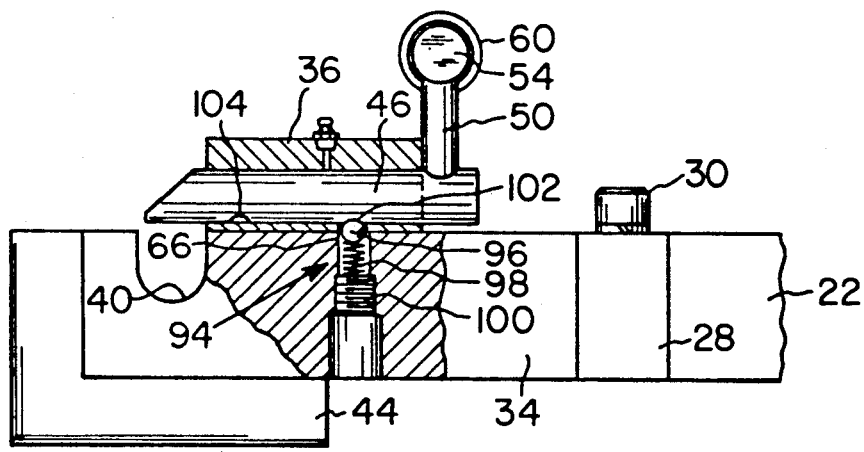
FIG. 7 is a partial section of a second embodiment of the invention.

In the embodiment of the adjustment mechanism 62 shown in FIG. 7 a ball detent and cup arrangement 94 is disposed in a bore 66 beneath each shaft 46. A ball 96 is biased upwardly by a spring 98 which rests on a plug 100 that is threaded into bore 66. Ball 96 engages a first cup 102 formed in the bottom of a shaft 46 when the shaft is in the forward lock position. When sleeve 60 is moved rearwardly, ball 96 is forced out of cup 102 and spring 98 is compressed to provide clearance for movement of the shaft. As the shaft reaches stop 30, ball 96 engages a second cup 104 in the shaft and locks the shaft in the rearward open position. Engagement and disengagement of each shaft 46 in this embodiment is accomplished simply by moving sleeve 60 because balls 96 automatically engage and disengage cups 102 and 104.

Figure 9:
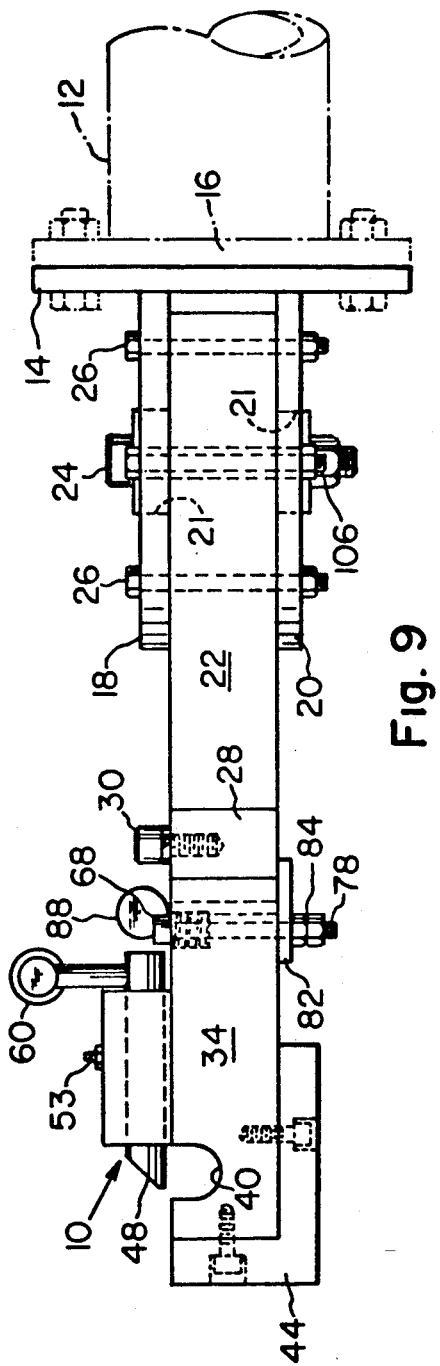
FIG. 9 is a side view of a third embodiment of the invention.
Figure 10:
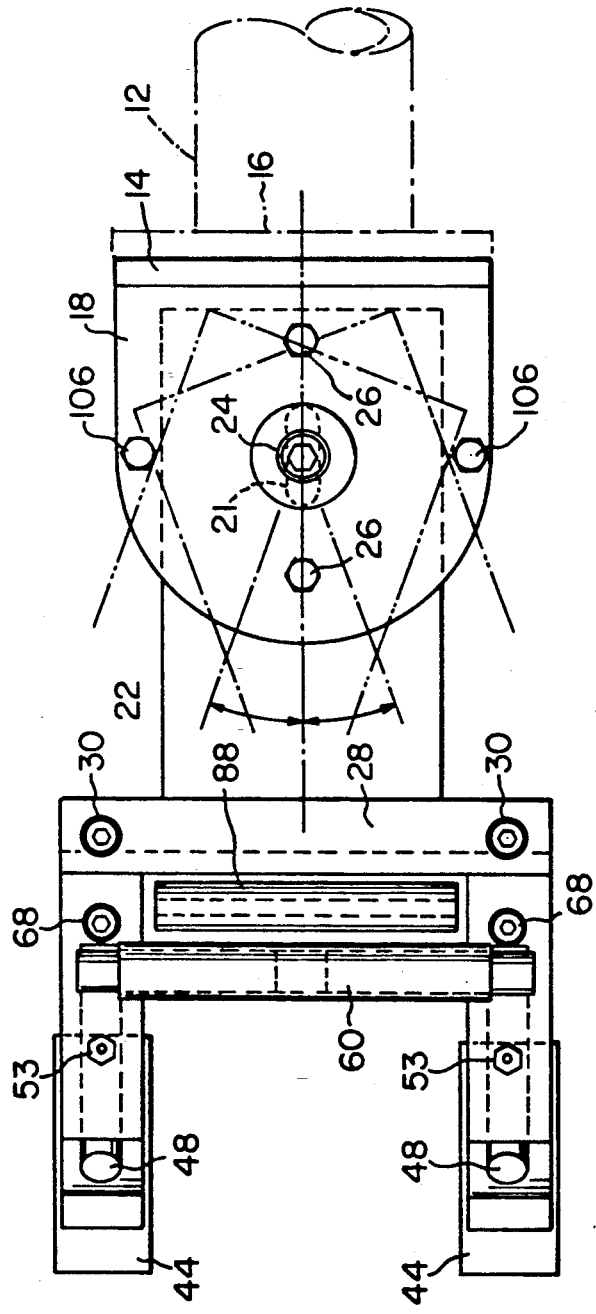
FIG. 10 is a plan view of the tow connector of FIG. 9.

FIGS. 9 and 10 show an embodiment of the invention which is substantially the same as that described in connection with FIGS. 1 and 2, except that this embodiment includes two bolts 106 which are mounted with a "sloppy fit" to extend between upper plate 18 and lower plate 20. Bolts 106 act as stops for arm 22 after shear pins 26 have been sheared. Bolts 106 are placed at a position radially spaced from the pivot point of arm 22 about bolt 24 in such a way as to restrict the angle of rotation A of arm 22 to less than 90° as measured from the longitudinal axis of tow connector 10. This enhances controllability of the aircraft when the tow connector is engaged thereon and the shear pins have been sheared. The "sloppy fit" of the bolts 106 prevents inadvertent application of compressive force to plates 18, 20, which could result from unnecessary tightening of bolts 106. Compression of plates 18, 20 would alter the preset shear values of shear pins 26, thus increasing the risk of damage to aircraft landing gear.

In all embodiments of the invention, the moveable sleeve 60 is mounted on bars 54 with a substantial degree of play therebetween. This play, in conjunction with gap 58 allows each shaft 46 to operate somewhat independently, thereby reducing the risk that shafts 46 will become skewed and bind in throughbores 38.

In operation, the connector 10 is mounted by flange 14 to a boom 12 which may be several feet long and which is mounted on a ground vehicle. The vehicle is moved toward nose strut 92 until connector 10 is disposed below lateral studs 90 with the shafts 46 in the open position. A jack on the boom raises the tow connector until studs 90 are located in notch 40 and shafts 46 are moved forwardly into the lock position. The aircraft is then ready for towing.

This invention is designed for use with commercial aircraft, and particularly with Fokker Aircraft, Model Nos. F-100 and F-28.

The foregoing describes preferred embodiments of the invention and is given by way of example only. The invention is not limited to any of the specific features described herein, but includes all such variations thereof within the scope of the appended claims.

I claim:

1. A tow connector adapted to engage a nose strut of an aircraft for towing the aircraft, said connector comprising:
   an arm;
   a base member attached perpendicular to an end of said arm, said base member having opposed free ends;
   stop means adjacent each of said free ends of said base member;
   a finger attached to each of said free ends of said base member, each of said fingers extending perpendicular to said base member and the longitudinal axis of each of said fingers being substantially parallel to the longitudinal axis of said arm, each of said fingers having an upper portion and a lower portion attached to said upper portion, said lower portion having a length greater than the length of said upper portion to form an exposed end;
   a longitudinal throughbore formed in said upper portion of each of said finger;
   an open top notch formed in said exposed end of said lower portion of each of said fingers;
   a shaft slideably mounted in each of said throughbores for movement between a first position substantially overlying the open top of said notch to close said open top of said notch and a second position adjacent to a stop to remove said shaft from said open top of said notch;
   an upright member attached to an end of each of said shafts;
   a bar attached to the distal end of each of said upright members;
   a sleeve freely encasing each of said bars; and
   adjustment means for moving said shafts between the first position wherein the front end of each of said shafts overlies said open top of one of said notches to close said notches and a second position wherein said shafts are removed from said open top of said notches to open said notches.

2. A tow connector as set forth in claim 1 including a grease fitting in flow connection with each of said throughbores for lubricating each of said throughbores and the shaft located therein.

3. A tow connector as set forth in claim 1 wherein said adjustment means for moving said shafts comprises:
   a bore located in the end of each of said fingers, each of said bores having an annular seat formed therein and an open lower end;
   a slidable pin in each of said bores, each of said pins having a head extending above the top surface of a finger and a lower and extending through said open lower end below the lower surface of a finger;

a spring located between each of said heads and an annular seat in a bore for upwardly biasing each of said pins;

a compression plate extending between the lower ends of said pins adjacent to the lower surface of each of said fingers, said compression plate having placed beveled bores for receiving said lower ends of said pins, said bores located on a longitudinal axis spaced from the longitudinal center line of said compression plate; and handle means attached to and extending upwardly from said compression plate to pivot said compression plate in a first direction with respect of the lower surface of each of said fingers to compress said springs and thereby move said pins downwardly to provide clearance for movement of said shafts in said throughbores.

4. A tow connector as set forth in claim 3 wherein said pins are positioned in said fingers so that when said heads are in the upper position, they are adjacent the rear ends of said shafts to prevent rearward movement of said shafts.

5. A tow connector as set forth in claim 3 wherein said heads of said pins engage the bottom surfaces of said shafts when said shafts are in the rearward position to prevent movement of said shafts in said throughbores.

6. A tow connector as set forth in claim 1 wherein said adjustment means comprises:

a bore located in each of said fingers;

a biasing spring in each of said bores and a ball detent supported on each of said springs;

a pair of spaced downwardly opening cups formed on the bottom of each of said shafts, wherein each of said balls is biased upwardly by a spring to engage a first cup on the bottom of a shaft when said shaft is in the retracted position and engages a second cup on the bottom of a shaft when said shaft is in the extended position.

7. A tow connector as set forth in claim 1 including a resilient bumper on the distal end of each of said fingers.

8. A tow connector as set forth in claim 1 including a flange, an upper plate and a spaced lower plate attached perpendicular to said flange, each of said plates having a central slot formed therein, means pivotally mounting the end of said arm opposite said base member between said spaced plates for slideable movement along said slot, and at least one shear pin extending between said spaced plates, said shear pin engaging said arm at a point radially spaced from the pivot point of said arm.

9. A tow connector adapted to engage a nose strut of an aircraft for towing the aircraft, said connector comprising:

an arm;

a base member having free ends attached to an end of said arm;

stop means mounted on the top surface of said base member adjacent each of said free ends of said base member;

a finger extending from each of said free ends of said base member perpendicular to said base member and having a longitudinal axis substantially parallel to the longitudinal axis of said arm, each of said fingers having an upper portion and a lower portion, said upper portion being shorter than said lower portion to form at least one exposed end on said lower portion;

a throughbore having a longitudinal axis substantially parallel to the longitudinal axis of said finger formed in said upper portion of each of said fingers;

an open top notch formed in said exposed end of the lower portion of each of said fingers;

a shaft slideably mounted in each of said throughbores for movement between an extended position over said open top notch and a retracted position adjacent one of said stops;

an upright member extending from the rear end of each of said shafts;

a perpendicular bar extending from the distal end of each of said upright members;

a moveable sleeve encasing said bars; and adjustment means for holding said shafts in an extended position wherein the front end of each of said shafts extends above the open top notch in one of said fingers and a retracted position wherein each of said shafts is removed from one of said open top notches, said adjustment means comprising a bore located in the rear portion of each of said fingers, a pin mounted in each of said bores and each of said pins having a head at the upper end adapted to extend above the top surface of one of said fingers and a lower end extending below the lower surface of one of said fingers, a counterbore in the upper end of each of said bores to form an annular seat in said bore, a spring located in each of said counterbores between said head of said pin and said annular seat to bias each of said pins upwardly, a compression plate extending between the lower ends of said pins adjacent the lower surfaces of said fingers and said base member, said compression plate having beveled bores at a position laterally spaced from the longitudinal center line of said compression plate for receiving the lower ends of said pins and means on the lower end of each of said pins to secure said compression plate to said pins, and a handle extending upwardly from said compression plate whereby movement of said handle toward said open top notches causes said compression plate to pivot in a first direction with respect to the bottom surfaces of said fingers and said base member to draw said pins downwardly and compress said springs to provide clearance for slideable movement of said shafts in said throughbores between the extended position and the retracted position.

10. A tow connector as set forth in claim 9 wherein said pins are positioned in said fingers so that when said pin heads extend upwardly they are adjacent to the rear ends of said shafts to prevent rearward movement of said shafts and secure said shafts in the extended position.

11. A tow connector as set forth in claim 9 wherein each of said pin heads engages the bottom surface of a shaft when said shaft is in the retracted position and applies an upward force to said shaft to prevent freesliding movement of said shaft.

12. A tow connector adapted to engage a nose strut of an aircraft for towing the aircraft, said tow connector comprising:

a flange having an upper plate and a spaced lower plate connected thereto, a central slot formed in said upper and lower plates;

an arm;

means pivotally mounting said arm between said plates for movement within said slots and at least one shear pin extending between said plates, said shear pin engaging said arm at a point readially spaced from the pivot point of said arm;

at least one abutment means extending between said upper and lower plates at a point radially spaced from the pivot point of said arm for restricting the angle of rotation of said arm;

a base member having spaced ends extending form the end of said arm opposite the end connected to said plates and a stop mounted on each of said ends of said base member;

a perpendicular finger extending from each of said ends of said base member, each of said fingers having an upper portion defining a throughbore;

a notch at the forward end of each of said fingers;

a shaft having an angled end slideably mounted in each of said throughbores for movement between a notch and a stop;

an upright member extending from the end of each of said shafts opposite the angled end;

a perpendicular bar extending from each of said upright members;

a moveable sleeve freely encasing said bars and bridging a gap defined by the spaced distal ends of said bars; and adjustment means for maintaining said shafts in an extending position wherein said angled ends extend above said notches and a retracted position wherein said shafts are removed from said notches.

13. A tow connector as set forth in claim 12 including bores in said upper and lower plates and said abutment means is a bolt loosely mounted.

14. A tow connector as set forth in claim 12 wherein said restricted angle of rotation is less than 90° from the longitudinal axis of said tow connector.

15. A tow connector as set forth in claim 12 wherein said adjustment means comprises a detent and cup means for each of said shafts, said means including a ball, a bore located in each finger beneath one of said shafts, and a spring in each bore biasing said ball upwardly, a pair of spaced indentations on the bottom of each shaft, whereby each of said balls in a finger engages a first indentation on the bottom of a shaft when said shaft is in the retracted position and a second indentation when said shaft is in the extended position.

16. A tow connector as set forth in claim 12 including a grease fitting in each of said fingers for lubricating each of said shafts and each of said throughbores.

17. A tow connector as set forth in claim 12 including a resilient bumper on the distal end of each of said fingers.

18. A tow connector as set forth in claim 12 wherein said adjustment means comprises:

a bore having an annular seat located in the end of each of said fingers and a slideable pin in each of said bores, each of said pins having a head extending above the top surface of said finger and a lower end extending below the lower surface of a finger;

a spring located between each head and each of said annular seats in said bores for upwardly biasing each of said pins;

a compression plate extending between the lower ends of said pins adjacent to the lower surface of each of said fingers, said compression plate having spaced beveled holes for receiving said lower end of each pin, said holes located on a longitudinal axis spaced from the longitudinal center line of said compression plate; and handle means attached to and extending upwardly from said compression plate to pivot said compression plate in a first direction with respect of the lower surfaces of said fingers and compress said springs and move said pins downwardly to provide clearance for movement of said shafts.

19. A tow connector as set forth in claim 18 wherein said pins are positioned in said fingers to prevent retraction of said shafts when said pins are fully extended upwardly.

20. A tow connector as set forth in claim 18 wherein each of said pin heads engages the bottom surface of one of said shafts to apply an upward force to said shaft to prevent free-sliding movement of said shaft in a throughbore.

* * * * *

UNITED STATES PATENT AND TRADEMARK OFFICE
CERTIFICATE OF CORRECTION

PATENT NO. : 5,129,667
DATED : July 14, 1992
INVENTOR(S) : Richard Gratton

It is certified that error appears in the above-identified patent and that said Letters Patent is hereby corrected as shown below:

Claim 1 Line 35 Column 6 "finger;" should read --fingers;--.

Claim 3 Line 67 Column 6 "lower and" should read --lower end--.

Claim 12 Line 2 Column 9 "readially" should read --radially--.

Claim 12 Line 8 Column 9 "form" should read --from--.

Signed and Sealed this

Twenty-fourth Day of August, 1993

Attest:

BRUCE LEHMAN

*Attesting Officer*  *Commissioner of Patents and Trademarks*